US012428255B2

(12) United States Patent
Yamamoto

(10) Patent No.: US 12,428,255 B2
(45) Date of Patent: Sep. 30, 2025

(54) SHEET TRANSPORT MECHANISM AND SHEET HANDLING APPARATUS

(71) Applicant: GLORY LTD., Hyogo (JP)

(72) Inventor: Eiki Yamamoto, Hyogo (JP)

(73) Assignee: GLORY LTD., Hyogo (JP)

( * ) Notice: Subject to any disclaimer, the term of this patent is extended or adjusted under 35 U.S.C. 154(b) by 383 days.

(21) Appl. No.: 18/069,373

(22) Filed: Dec. 21, 2022

(65) Prior Publication Data

US 2024/0208760 A1 Jun. 27, 2024

(51) Int. Cl.

| | |
|---|---|
| ***B65H 29/70*** | (2006.01) |
| ***B65H 5/02*** | (2006.01) |
| ***G07D 11/175*** | (2019.01) |

(52) U.S. Cl.

CPC ............. *B65H 29/70* (2013.01); *B65H 5/023* (2013.01); *G07D 11/175* (2019.01); *B65H 2301/51214* (2013.01); *B65H 2301/51256* (2013.01); *B65H 2404/1321* (2013.01); *B65H 2404/251* (2013.01); *B65H 2404/252* (2013.01); *B65H 2701/1912* (2013.01)

(58) Field of Classification Search

CPC .................... B65H 29/70; B65H 5/023; B65H 2301/51256

See application file for complete search history.

(56) References Cited

U.S. PATENT DOCUMENTS

| | | | | |
|---|---|---|---|---|
| 3,545,371 A * | 12/1970 | Reist | B65H 29/70 | 101/23 |
| 6,499,737 B2 * | 12/2002 | Slocum | B65H 29/70 | 271/188 |
| 7,697,884 B2 * | 4/2010 | Tateishi | B65H 29/242 | 399/401 |
| 10,287,121 B2 * | 5/2019 | Oe | B65H 5/36 | |
| 10,490,011 B2 | 11/2019 | Liang | | |
| 2012/0119437 A1 * | 5/2012 | Koike | B41J 13/03 | 271/272 |

FOREIGN PATENT DOCUMENTS

| | | | |
|---|---|---|---|
| EP | 2865626 A1 * | 4/2015 | B65H 29/125 |
| JP | 63306158 A * | 12/1998 | |

* cited by examiner

*Primary Examiner* — Patrick Cicchino

(74) *Attorney, Agent, or Firm* — Shih IP Law Group, PLLC.

(57) ABSTRACT

Provided is a sheet transport mechanism disposed between a feeding mechanism feeding out a sheet and an acceptance mechanism receiving the sheet. The sheet transport mechanism includes: a transport unit that transports the sheet; and a plurality of curl correction units each including a contact unit which comes into contact with the sheet that is transported by the transport unit. The plurality of curl correction units is disposed at positions different from each other on a transport route of the transport unit, respectively.

13 Claims, 14 Drawing Sheets

SHEET TRANSPORT MECHANISM AND SHEET HANDLING APPARATUS

TECHNICAL FIELD

The present disclosure relates to a sheet transport mechanism that transports a sheet and a sheet handling apparatus comprising the sheet transport mechanism.

BACKGROUND ART

A sheet handling apparatus that handles a sheet such as a banknote may handle a curled sheet.

SUMMARY

A sheet transport mechanism according to the present disclosure is a sheet transport mechanism disposed between a feeding mechanism and an acceptance mechanism, where the feeding mechanism feeds out a sheet and the acceptance mechanism receives the sheet. The sheet transport mechanism comprises: a transport unit that transports the sheet; and a plurality of curl correction units each comprising a contact unit, where the contact unit comes into contact with the sheet that is transported by the transport unit. The plurality of curl correction units is disposed at positions different from each other on a transport route of the transport unit, respectively.

DESCRIPTION OF EMBODIMENTS

Figure 1:
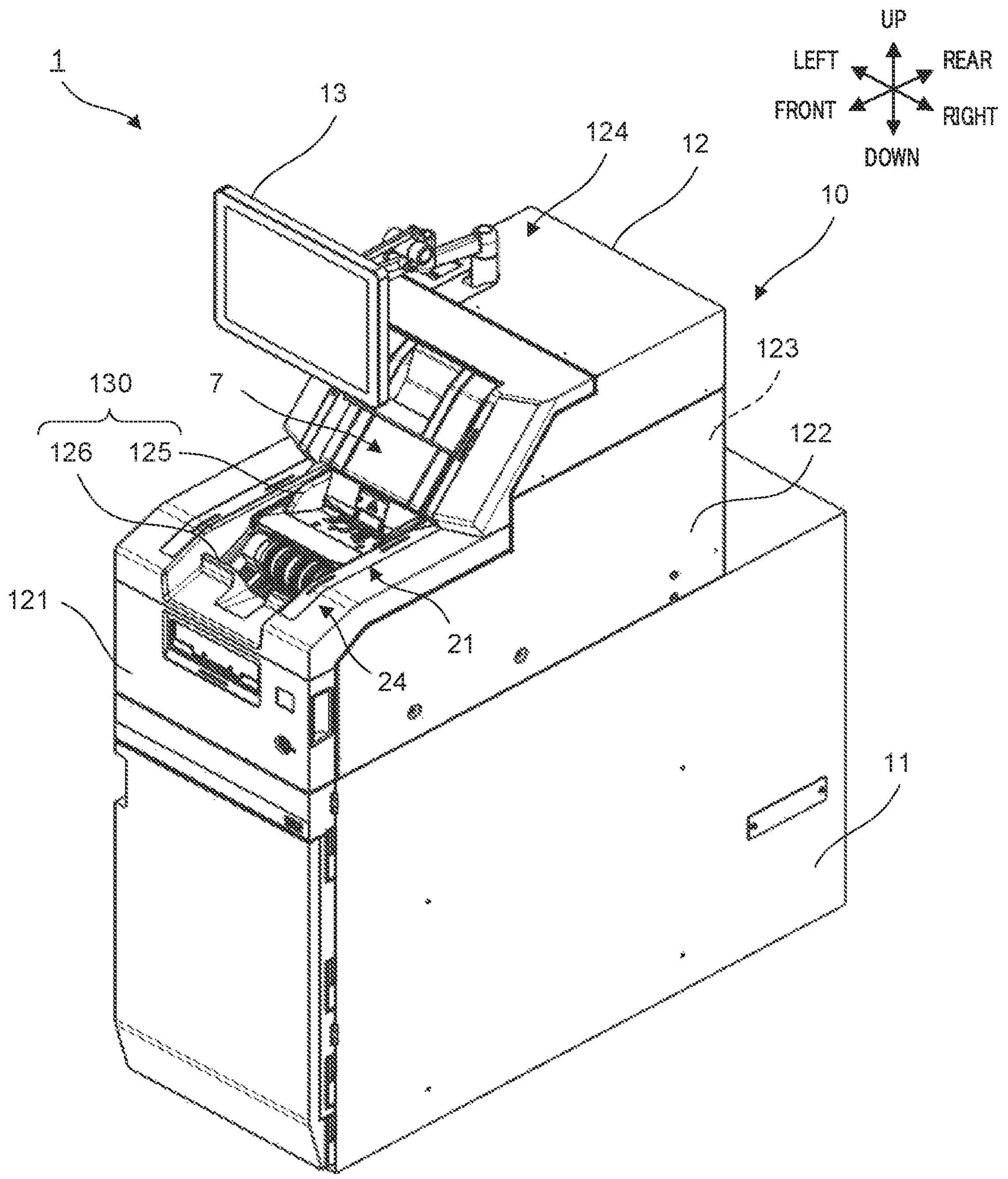
FIG. 1 is a perspective view of an external appearance of a sheet handling apparatus according to Embodiment 1.

There is a tape-type storage unit that winds up a sheet, together with a tape, on a drum. A sheet stored in the tape-type storage unit may have a tendency to be curled in accordance with the shape of the drum. In such a case, the sheet taken out from the tape-type storage unit is in a curled state. When the sheet is stored in the tape-type storage unit for a longer period, the sheet may be strongly curled.

There is known a sheet handling apparatus comprising a curl correction mechanism for correcting curl of a sheet to be transported by a transport unit. For example, US Patent Application No. 20180244483 discloses that curl correction mechanisms are disposed at two locations: near a sheet storage mechanism and at an outlet section through which a sheet is ejected, or at two locations: near the sheet storage mechanism and near a temporary storage unit for binding, which is used to bind temporarily stacked sheets.

Curl of a sheet is corrected by the sheet passing through a curl correction mechanism. However, according to the curl correction mechanisms of US Patent Application No. 20180244483, since a sheet transported to the sheet storage mechanism, the outlet section, or the temporary storage unit for binding only once passes through a curl correction mechanism, curl of the sheet may not be sufficiently corrected.

An object of the present disclosure is to provide a sheet transport mechanism and a sheet handling apparatus each of which the degree of curled sheet correction is improved.

A sheet transport mechanism according to an aspect of the present disclosure is a sheet transport mechanism disposed between a feeding mechanism and an acceptance mechanism, where the feeding mechanism feeds out a sheet and the acceptance mechanism receives the sheet. The sheet transport mechanism comprises: a transport unit that transports the sheet; and a plurality of curl correction units each comprising a contact unit, where the contact unit comes into contact with the sheet that is transported by the transport unit. The plurality of curl correction units is disposed at positions different from each other on a transport route of the transport unit, respectively.

Thus, a sheet fed out from the feeding mechanism passes through the plurality of curl correction units until the sheet is received by the acceptance mechanism. Accordingly, it is possible to improve the degree of sheet curl correction in comparison with a case where a sheet passes through only one curl correction unit.

Further, according to the sheet transport mechanism according to an aspect of the present disclosure, the contact unit causes a crease in the sheet with which the contact unit comes in contact, where the crease is a crease along a transport direction of the transport unit. Thus, curl of the sheet is corrected.

Further, according to the sheet transport mechanism according to an aspect of the present disclosure, the plurality of curl correction units causes a plurality of the creases at positions of the sheet, respectively, where the positions differ from each other. Thus, it is possible to improve the degree of sheet curl correction in comparison with a case where a sheet passes through only one curl correction unit.

According to the sheet transport mechanism according to an aspect of the present disclosure, the transport unit comprises a belt, and each of the plurality of contact units is a flange provided in a pulley that drives the belt. Thus, it is possible to realize the curl correction unit with a simple configuration.

According to the sheet transport mechanism according to an aspect of the present disclosure, the plurality of curl correction units each comprises a plurality of the flanges and a distance between the plurality of flanges comprised in each of the plurality of curl correction units varies depending on the plurality of curl correction units. Thus, each of the plurality of curl correction units can cause the plurality of creases at different positions of the sheet.

A sheet handling apparatus according to an aspect of the present disclosure comprises: a feeding mechanism that feeds out a sheet; an acceptance mechanism that receives the sheet; and a first sheet transport mechanism disposed between the feeding mechanism and the acceptance mechanism. The first sheet transport mechanism comprises: a transport unit that transports the sheet; and a plurality of curl correction units each comprising a contact unit, where the contact unit comes into contact with the sheet that is transported by the transport unit. The plurality of curl correction units is disposed at positions different from each other on a transport route of the first sheet transport mechanism, respectively.

Thus, a sheet fed out from the feeding mechanism passes through the plurality of curl correction units until the sheet is received by the acceptance mechanism. Accordingly, it is possible to improve the degree of sheet curl correction in comparison with a case where a sheet passes through only one curl correction unit.

According to the sheet handling apparatus according to an aspect of the present disclosure, the feeding mechanism feeds out the sheet to the transport unit, where the sheet has been taken out from a storage cassette that stores the sheet. Thus, in a case where a sheet stored in the storage cassette is in a curled state, it is possible to cause the curl of the sheet to be correct.

According to the sheet handling apparatus according to an aspect of the present disclosure, the feeding mechanism feeds out the sheet to the transport unit, where the sheet has been taken out from a tape-type storage unit that stores the sheet by winding up the sheet, together with a tape, on a drum. Thus, it is possible to cause curl of a sheet, which is curled by being stored in the tape-type storage unit, to be corrected.

The sheet handling apparatus according to an aspect of the present disclosure further comprises a second sheet transport mechanism disposed between an inlet and the acceptance mechanism, where the inlet receives a deposit of the sheet. The plurality of curl correction units is disposed at positions on the transport route of the first sheet transport mechanism, respectively, where the positions do not overlap with a transport route of the second sheet transport mechanism. Thus, in a case where a non-curled sheet is deposited through the inlet, the non-curled sheet does not pass through the curl correction unit. Accordingly, a time of transport by the second sheet transport mechanism is not extended by performing an unnecessary curl correction operation on the non-curled sheet.

The sheet handling apparatus according to an aspect of the present disclosure further comprises a recognition unit that recognizes the sheet. The plurality of curl correction units is disposed upstream of the recognition unit on the transport route of the first sheet transport mechanism. Thus, since curl of the sheet passing through the recognition unit has been corrected, a recognition operation can be easily performed by the recognition unit.

According to the sheet handling apparatus according to an aspect of the present disclosure, the acceptance mechanism receives the sheet to be collected in a collection unit that collects the sheet. Thus, it is possible to cause the collection unit to collect a sheet whose curl has been corrected.

According to the sheet handling apparatus according to an aspect of the present disclosure, the acceptance mechanism receives the sheet to be dispensed to an outlet through which the sheet is dispensed outside the sheet handling apparatus. Thus, it is possible to dispense a sheet, whose curl has been corrected, from the outlet.

Hereinafter, embodiments of the present disclosure will be described in detail with reference to the accompanying drawings.

Embodiment 1

Figure 2:
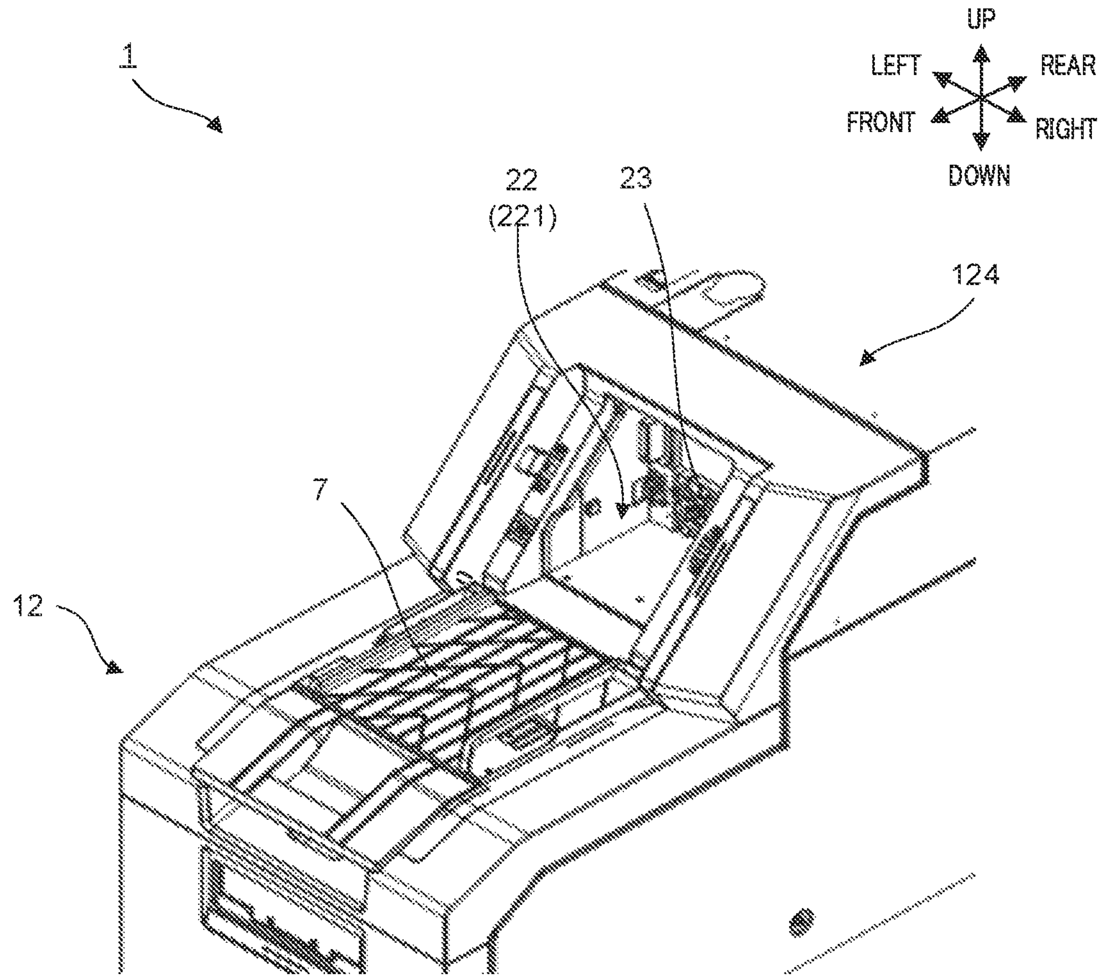
FIG. 2 is a perspective view of an upper housing in a state in which a closing member closes a transaction port and a storage cassette is not attached.
Figure 3:
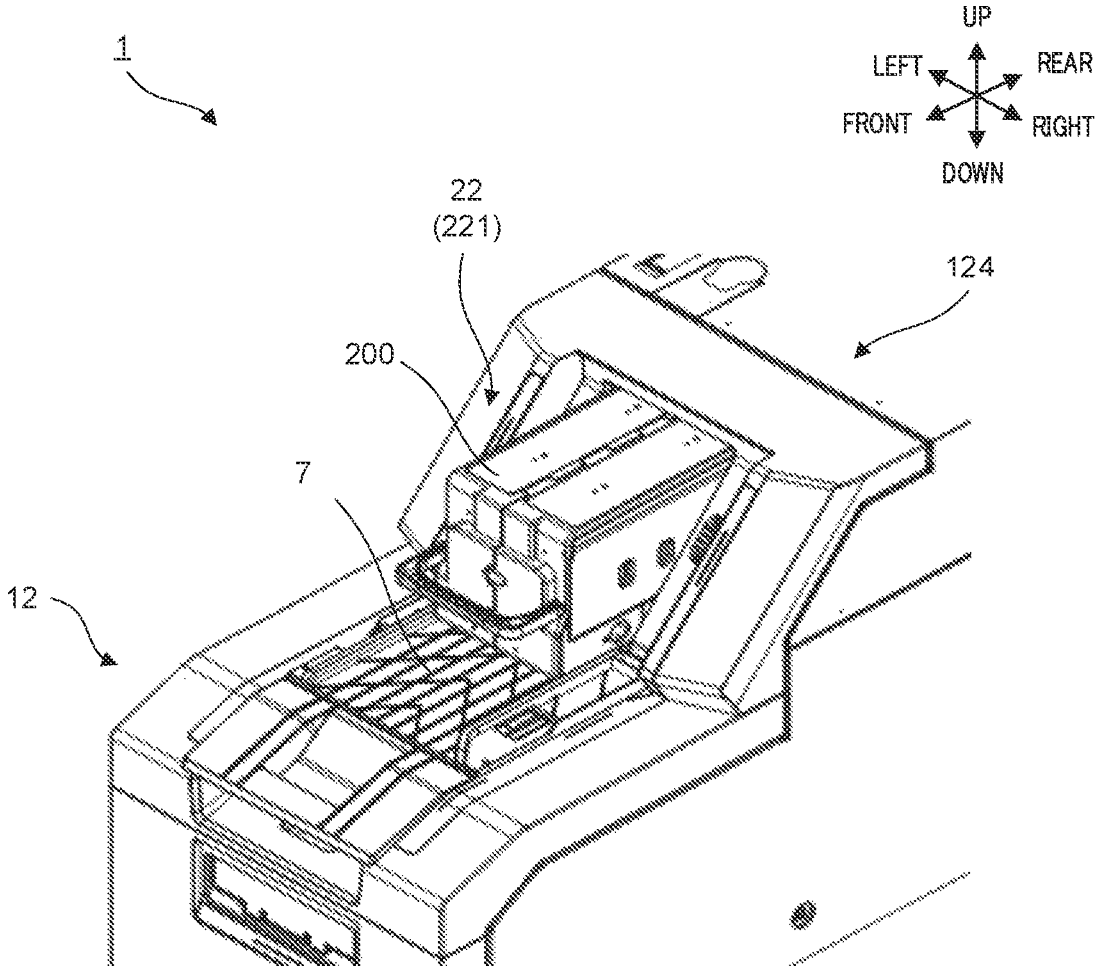
FIG. 3 is a perspective view of the upper housing in a state in which the closing member closes the transaction port and the storage cassette is attached.
Figure 4:
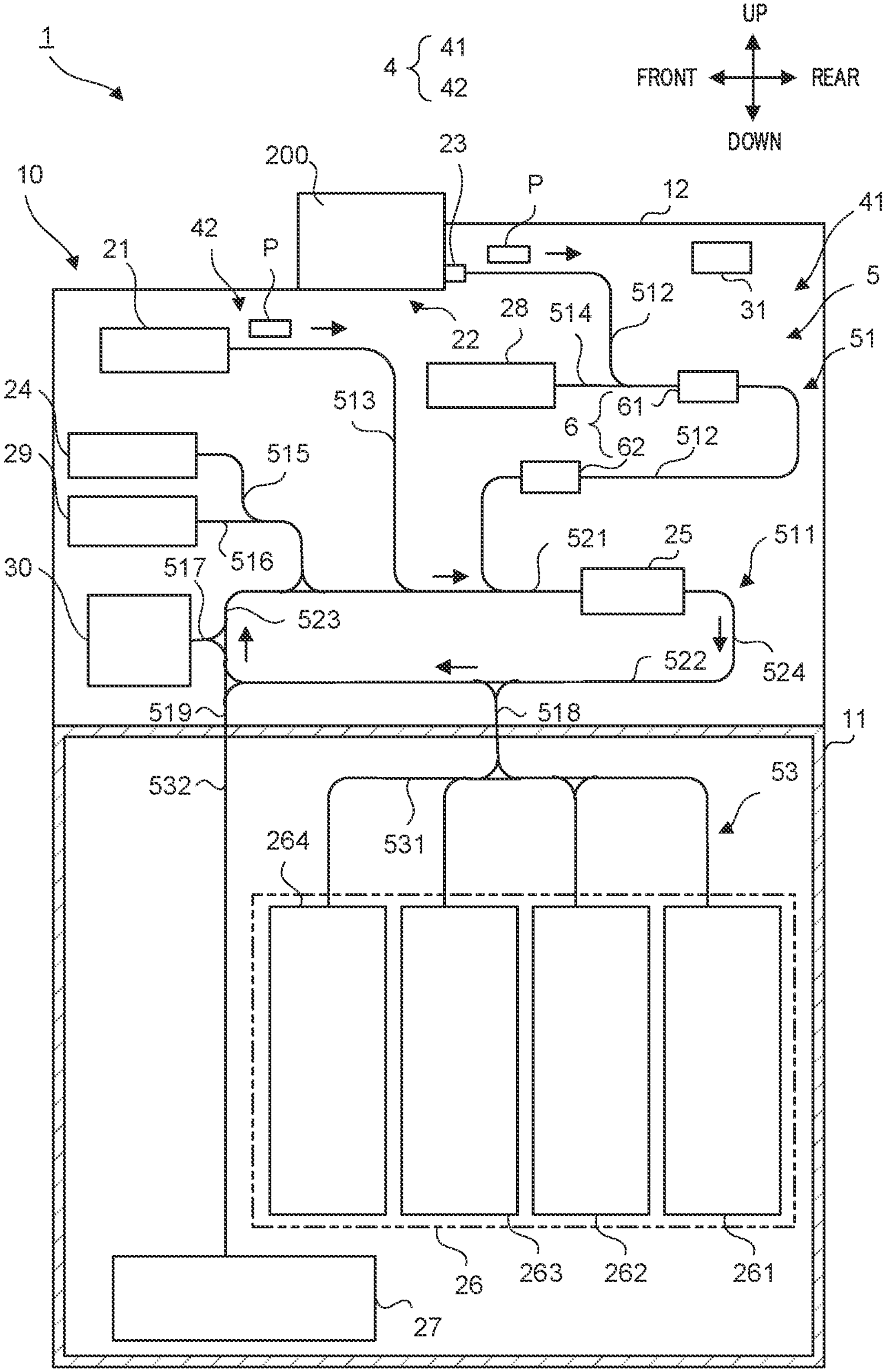
FIG. 4 is a schematic diagram illustrating an inner configuration of the sheet handling apparatus according to Embodiment 1.

FIG. 1 is a perspective view of an external appearance of a sheet handling apparatus according to Embodiment 1. In FIG. 1, an upper housing is in a state in which a closing member closes an attachment port. FIG. 2 is a perspective view of the upper housing in a state in which the closing member closes a transaction port and a storage cassette is not attached. FIG. 3 is a perspective view of the upper housing in a state in which the closing member closes the transaction port and the storage cassette is attached. FIG. 4 is a schematic diagram illustrating an inner configuration of the sheet handling apparatus according to Embodiment 1.

In the following description, the side on which the user who utilizes a sheet handling apparatus 1 accesses the sheet handling apparatus 1 will be referred to as the front and the opposite side will be referred to as the rear. Further, the upper, lower, left, and right sides viewed from the user who utilizes the sheet handling apparatus 1 will be referred to as the up, down, left, and right, respectively. The user who utilizes the sheet handling apparatus 1 is a person who executes various pieces of processing such as depositing processing, dispensing processing, or the like by using the sheet handling apparatus 1.

In the present embodiment, the sheet handling apparatus 1 is capable of handling a banknote that is an example of the sheet. The sheet handling apparatus 1 is installed in, for example, a store such as a retail store or in a back office of a financial institution such as a bank. Other examples of the sheet are a check and the like.

The sheet handling apparatus 1 comprises a housing 10 comprising a lower housing 11 and an upper housing 12.

The lower housing 11 comprises a structure as a safe. The lower housing 11 comprises a door that is locked such that only authorized persons are allowed to access the inside of the lower housing 11.

The upper housing 12 is disposed on the lower housing 11. The upper housing 12 is provided with an operation unit 13 that is used to operate the sheet handling apparatus 1. The operation unit 13 is formed of, for example, a touch screen. The upper housing 12 comprises a front surface 121, left and right side surfaces 122, a rear surface 123, and an upper surface 124.

As illustrated in FIG. 1, the upper surface 124 is provided with an inlet 125 and an outlet 126. The inlet 125 and the outlet 126 form a transaction port 130. In the example illustrated in FIG. 1 or the like, the inlet 125 is provided on the rear side of the outlet 126 in the upper surface 124.

Further, as illustrated in FIG. 2, the upper surface 124 is provided with an attachment port 221 that forms a cassette attachment unit 22. In the examples illustrated in FIGS. 1 and 2 or the like, the attachment port 221 is provided on the rear side of the transaction port 130. As illustrated in FIG. 3, a storage cassette 200 inserted into the attachment port 221 is attached to the cassette attachment unit 22.

The storage cassette 200 is a cassette that can be carried by the user in a state in which a sheet is stored therein. The storage cassette 200 is designed to be capable of transmitting and receiving a banknote P to and from a specific apparatus such as the sheet handling apparatus 1 when the storage cassette 200 is attached to the specific apparatus. The storage cassette 200 is designed to be incapable of taking out the banknote P therein when the storage cassette 200 is separated from the specific apparatus.

The storage cassette 200 comprises at least a storage mechanism that stores the banknote P (see FIG. 4) and a discharge mechanism that discharges the banknote P that has been stored.

In Embodiment 1, the storage mechanism of the storage cassette 200 is a tape-type storage unit that uses a strip-shaped tape attached to the outer peripheral surface of a drum to wind up the banknote P, together with the tape, on the drum. For this reason, it is assumed that a sheet stored in the storage cassette 200 is a strongly curled state due to a continued state in which the banknote is wound on the drum.

As illustrated in FIGS. 1 to 3, the upper surface 124 is provided with a closing member 7. The closing member 7 is configured to close at least one of the transaction port 130 and the attachment port 221. The closing member 7 may also be configured to alternatively close one of the transaction port 130 and the attachment port 221 and not to close the other. The closing member 7 closes the attachment port 221 in a case where the user utilizes the transaction port 130 and closes the transaction port 130 in a case where the user attaches the storage cassette 200 to the attachment port 221.

Next, an inner configuration of the sheet handling apparatus 1 will be described. As illustrated in FIG. 4, the sheet handling apparatus 1 comprises a depositing unit 21, the cassette attachment unit 22, a cassette handling unit 23, a dispensing unit 24, a recognition unit 25, a storage unit 26, a collection unit 27, an upper reject storage unit 28, a count reject storage unit 29, a temporary storage unit 30, a sheet transport mechanism 4, and a control unit 31.

The depositing unit 21, the cassette attachment unit 22, the cassette handling unit 23, the dispensing unit 24, the recognition unit 25, the upper reject storage unit 28, the count reject storage unit 29, the temporary storage unit 30, and the control unit 31 are provided in the upper housing 12. The storage unit 26 and the collection unit 27 are provided in the lower housing 11. Note that, the control unit 31 may be provided in the lower housing 11.

The sheet transport mechanism 4 is configured to be capable of transporting the banknote P between the lower housing 11 and the upper housing 12. The sheet transport mechanism 4 comprises, for example, an endless belt guided on at least a pair of rollers or at least one roller, and motors for driving those described above.

The sheet transport mechanism 4 comprises a first sheet transport mechanism 41 that transports the banknote P, which has been fed out from the cassette handling unit 23, to the storage unit 26 of the lower housing 11, and a second sheet transport mechanism 42 that transports the banknote P, which has been fed out from the depositing unit 21, to the storage unit 26 of the lower housing 11. The first sheet transport mechanism 41 and the second sheet transport mechanism 42 partially overlap.

The depositing unit 21 stacks a plurality of the banknotes P, which has been manually inputted by the user via the inlet 125, in a stacked state, and takes in the plurality of banknotes P, which has been stacked, one by one.

The cassette attachment unit 22 receives attachment of the storage cassette 200 inserted into the attachment port 221. When the storage cassette 200 is attached to the cassette attachment unit 22, a connector of the cassette attachment unit 22 is connected to a connector of the storage cassette 200, and the control unit 31 can control the storage cassette 200.

The cassette handling unit 23 feeds out the banknote P, which has been taken out from the storage cassette 200 attached to the cassette attachment unit 22, to the sheet transport mechanism 4. The cassette handling unit 23 is an example of the feeding mechanism of the present disclosure in the present Embodiment 1.

The dispensing unit 24 stacks the banknote P, which is transported from the sheet transport mechanism 4, in the outlet 126.

The recognition unit 25 generates signals indicating the denomination, authentication, and fitness of the banknote P transported by the sheet transport mechanism 4. These signals are transmitted to the control unit 31. The recognition unit 25 is also capable of generating signals for detecting the attitude and size of the banknote P during transport and the interval between the banknotes P and transmitting the signals to the control unit 31.

The storage unit 26 and the collection unit 27 receive and store the banknotes P one by one. The storage unit 26 is capable of feeding out, based on the control of the control unit 31, the banknote P that has been stored. The collection unit 27 is, on the other hand, set such that feeding out the banknote P by the control of the control unit 31 cannot be performed. Herein, collecting refers to storing a sheet such that feeding out the sheet by the control unit cannot be performed. The storage unit 26 and the collection unit 27 are examples of the acceptance mechanism of the present disclosure in the present Embodiment 1.

The storage unit 26 comprises a first storage box 261, a second storage box 262, a third storage box 263, and a fourth storage box 264. In the present Embodiment 1, the first to fourth storage boxes 261 to 264 may be stacking-type storage units that stack and store the banknotes P or may be tape-type storage units that use a strip-shaped tape attached to the outer peripheral surface of a drum to wind up the banknote P, together with the tape, on the drum. The first to fourth storage boxes 261 to 264 are capable of taking in and storing the banknotes P one by one and feeding out the stored banknotes one by one by the control of the control unit 31. Denominations of the banknotes P to be stored in the first to fourth storage boxes 261 to 264, respectively, may be set in advance.

In the example illustrated in FIG. 4, the storage unit 26 comprises four storage boxes. This is, however, an example and the number of storage boxes may be less than three or may be equal to or greater than five.

For example, at the time of the depositing processing of storing the banknote P, which has been discharged from the storage cassette 200 to the sheet transport mechanism 4, in the storage unit 26, the upper reject storage unit 28 stores the banknote P determined as non-depositable by the control unit 31 based on the signals from the recognition unit 25. For example, at the time of the dispensing processing of dispensing the banknote P stored in the storage unit 26, the upper reject storage unit 28 stores the banknote P determined as non-dispensable by the control unit 31 based on the signals from the recognition unit 25. The banknote P stored in the upper reject storage unit 28 can be taken out from outside the sheet handling apparatus 1 by the user.

The count reject storage unit 29 stores, among the banknotes P determined as non-depositable at the time of the depositing processing of the banknote P fed out from the storage cassette 200 to the sheet transport mechanism 4, a banknote detected as being in a particularly considerably skewed state by the control unit 31 based on the signals from the recognition unit 25, for example. The count reject storage unit 29 is configured such that the banknote P that has been stored can be taken out from outside.

The temporary storage unit 30 temporarily stores the banknote P at the time of the depositing processing, for example. The temporary storage unit 30 is a tape-type storage unit that stores the banknote P by winding up the banknote P, together with a tape, on a drum.

The control unit 31 controls the sheet handling apparatus 1 in its entirety. The control unit 31 is a processor or a microcomputer.

The sheet transport mechanism 4 comprises a transport unit 5 comprising an upper-side transport unit 51 and a lower-side transport unit 53. The upper-side transport unit 51 is provided in the upper housing 12. The lower-side transport unit 53 is provided in the lower housing 11.

The upper-side transport unit 51 comprises a first transport path 511, a second transport path 512, a third transport path 513, a fourth transport path 514, a fifth transport path 515, a sixth transport path 516, a seventh transport path 517, an eighth transport path 518, and a ninth transport path 519.

The first transport path 511 is disposed in a loop shape. The first transport path 511 comprises an upper-side path 521 extending frontward and rearward, a lower-side path 522 extending frontward and rearward below the upper-side path 521, a front reverse rotation path 523 connecting the upper-side path 521 and the lower-side path 522 on the front side, and a rear reverse rotation path 524 connecting the upper-side path 521 and the lower-side path 522 on the rear side. The upper-side path 521 is provided with the recognition unit 25.

The second transport path 512 connects the upper-side path 521 and the cassette handling unit 23. The third transport path 513 connects a position on the upper-side path 521 frontward from the recognition unit 25 and the depositing unit 21. The second transport path 512 is connected to the upper-side path 521 on the rear side of the connection part with the third transport path 513. The fourth transport path 514 connects the upper reject storage unit 28 and the second transport path 512.

The fifth transport path 515 connects the upper-side path 521 and the dispensing unit 24. The fifth transport path 515 is connected to the upper-side path 521 on the front side of the connection part with the third transport path 513. The sixth transport path 516 connects the fifth transport path 515 and the count reject storage unit 29. The seventh transport path 517 connects the front reverse rotation path 523 and the temporary storage unit 30. The eighth transport path 518 connects the front reverse rotation path 523 and the lower-side transport unit 53. The ninth transport path 519 connects the lower-side path 522 and the lower-side transport unit 53.

The lower-side transport unit 53 comprises an eleventh transport path 531 and a twelfth transport path 532.

The eleventh transport path 531 connects the eighth transport path 518 and the first to fourth storage boxes 261 to 264. The twelfth transport path 532 connects the ninth transport path 519 and the collection unit 27.

That is, the first transport path 511 is connected to one storage box comprised in the storage unit 26 via the eighth transport path 518 and the eleventh transport path 531. In the following description, a transport path (the eighth transport path 518 and the eleventh transport path 531) connecting the first transport path 511 and one storage box of the storage unit 26 will be referred to as a storage transport path. Further, the first transport path 511 is connected to the collection unit 27 via the ninth transport path 519 and the twelfth transport path 532.

The transport unit 5 comprises a belt, a plurality of pulleys that drives the belt, motors that rotate the pulleys, side walls, and the like. Note that, the transport unit 5 may further comprise pulleys for positioning the belt regardless of the drive of the belt. Tracking sensors that detect the passage of the banknote P are provided at predetermined positions in the transport unit 5. The control unit 31 detects the position of the banknote P based on detection signals from the tracking sensors and controls the transport unit 5 to thereby transport the banknote P to a predetermined configuration.

The first sheet transport mechanism 41 in the sheet transport mechanism 4 transports a sheet fed out from the cassette handling unit 23 to one storage box comprised in the storage unit 26. That is, a transport route of the first sheet transport mechanism 41 comprises the second transport path 512, the upper-side path 521, the rear reverse rotation path 524, the lower-side path 522, and the storage transport path.

The second sheet transport mechanism 42 in the sheet transport mechanism 4 transports, on the other hand, a sheet fed out from the depositing unit 21 to one storage box comprised in the storage unit 26. That is, a transport route of the second sheet transport mechanism 42 comprises the third transport path 513, the upper-side path 521, the rear reverse rotation path 524, the lower-side path 522, and the storage transport path.

As described above, the transport route of the first sheet transport mechanism 41 and the transport route of the second sheet transport mechanism 42 partially overlap. In the example illustrated in FIG. 4, the transport route of the first sheet transport mechanism 41 and the transport route of the second sheet transport mechanism 42 overlap in the upper-side path 521, the rear reverse rotation path 524, the lower-side path 522, and the storage transport path. On the transport route of the first sheet transport mechanism 41, the second transport path 512 does not overlap with the transport route of the second sheet transport mechanism 42. On the transport route of the second sheet transport mechanism 42, the third transport path 513 does not overlap with the transport route of the first sheet transport mechanism 41.

In Embodiment 1, it is assumed that the banknote P stored in the storage cassette 200 is in a strongly curled state, and that the banknote P deposited by the user through the depositing unit 21 is not curled or has a degree of curl smaller than that in the case of the storage cassette 200.

On the transport route of the first sheet transport mechanism 41, the second transport path 512 that does not overlap with the transport route of the second sheet transport mechanism 42 comprises a plurality of curl correction units 6 disposed thereon, which is used to correct the banknote P that is curled by being stored in the storage cassette 200.

Figure 5:
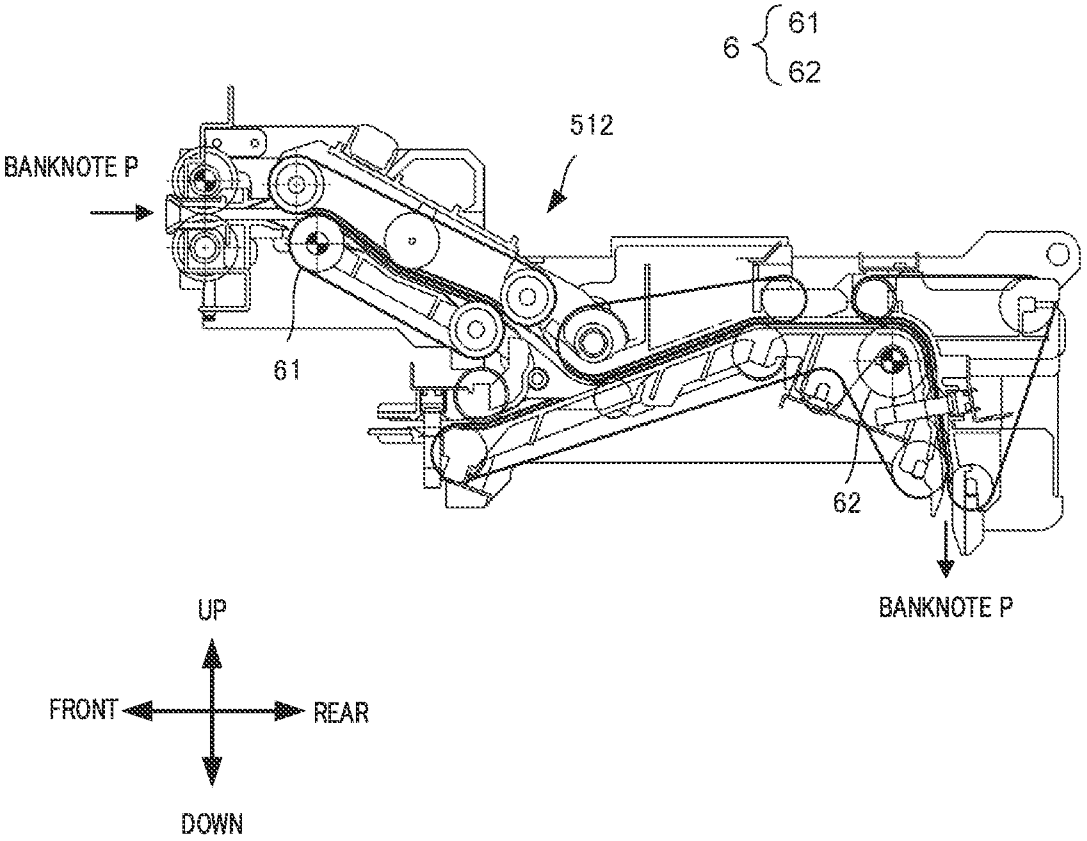
FIG. 5 illustrates an example of a disposition position of a curl correction unit on a second transport path.

FIG. 5 illustrates a more detailed example of a disposition position of the curl correction unit 6 on the second transport path 512. In the example illustrated in FIG. 5, a first curl correction unit 61 and a second curl correction unit 62 are disposed on the second transport path 512. In the example illustrated in FIG. 5, the first curl correction unit 61 is provided upstream of the second curl correction unit 62 in the transport direction of the second transport path 512. The second curl correction unit 62 is provided downstream of the first curl correction unit 61 in the transport direction.

Figure 6:
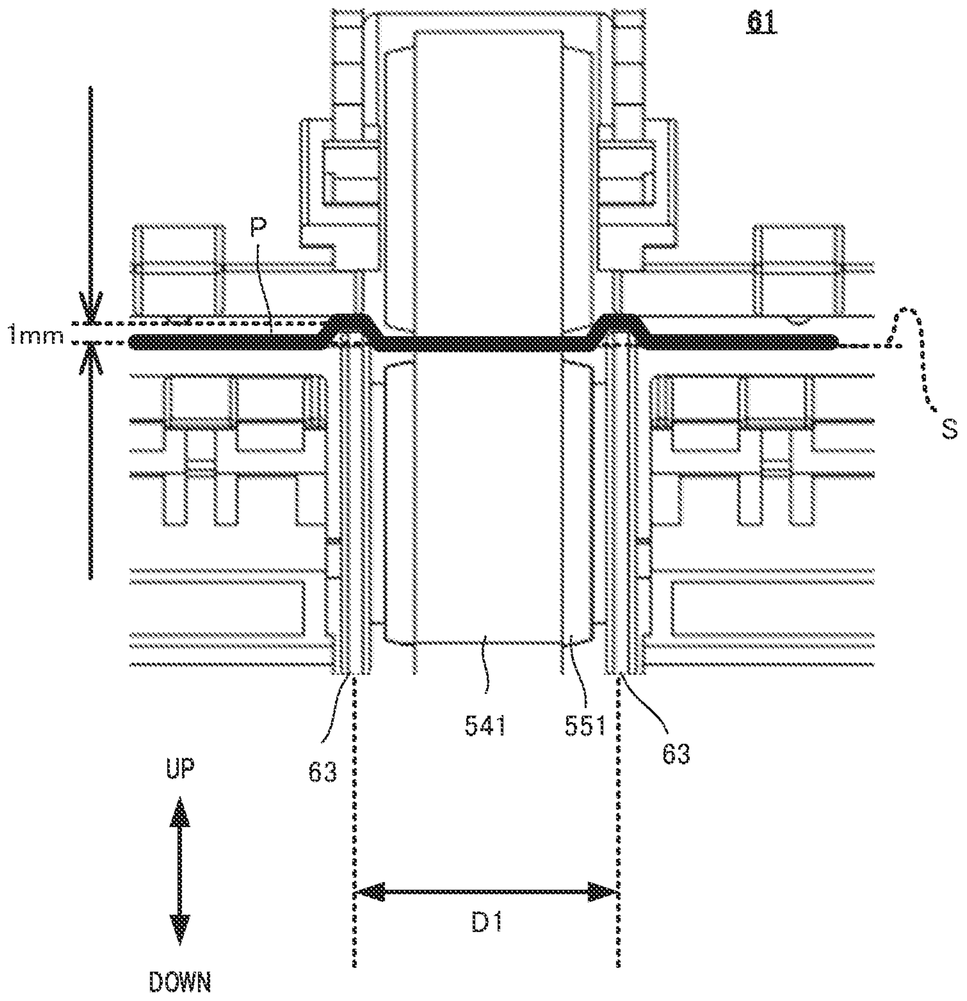
FIG. 6 is a cross-sectional view provided for describing a first curl correction unit.
Figure 7:
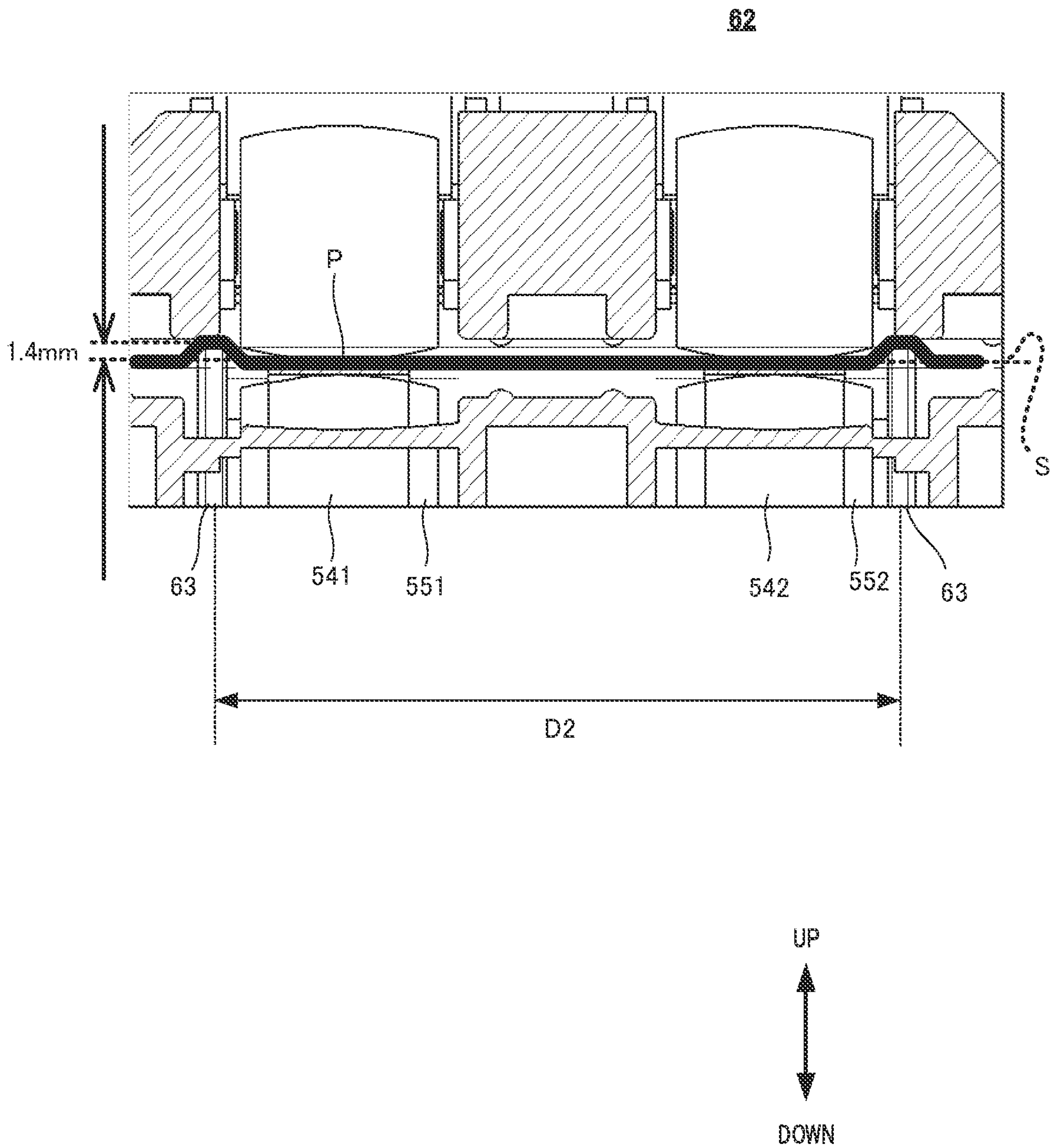
FIG. 7 is a cross-sectional view provided for describing a second curl correction unit.

FIG. 6 is a schematic diagram provided for describing the first curl correction unit 61. FIG. 7 is a schematic diagram provided for describing the second curl correction unit 62. FIGS. 6 and 7 illustrate how the first curl correction unit 61 and the second curl correction unit 62 look like when viewed from a direction perpendicular to the transport direction.

As illustrated in FIGS. 6 and 7, the curl correction unit 6 comprises at least two contact units 63. The contact unit 63 is a flange provided in an end part of a pulley 55 that drives a belt 54 with a drive force given by a motor. In the examples illustrated in FIGS. 6 and 7, the contact units 63 are provided in the pulley 55 disposed on the lower side of the banknote P.

The first curl correction unit 61 illustrated in FIG. 6 is an example of the curl correction unit in a case where the transport unit 5 comprises the belt 54 that is one belt. The second curl correction unit 62 illustrated in FIG. 7 is an example of the curl correction unit in a case where the transport unit 5 comprises two belts 541 and 542 disposed perpendicular to the transport direction. Note that, the transport direction of the transport unit 5 in FIGS. 6 and 7 is a direction perpendicular to the paper surface.

In a case where the transport unit 5 comprises the belt 541 that is one belt as illustrated in FIG. 6, the contact units 63 of the first curl correction unit 61 are flanges provided in both end parts of the pulley 55. In FIGS. 6 and 7, in a case where the transport unit 5 comprises the two belts 541 and 542 disposed perpendicular to the transport direction as illustrated in FIG. 7, the contact units 63 of the second curl correction unit 62 are flanges provided in one end part of a pulley 551, which drives the belt 541, and one end part of a pulley 552, which drives the belt 542, respectively. In FIG. 7, the two contact units 63 are provided in end parts of the two pulleys 551 and 552, respectively, where the end parts are separated from each other.

The interval between the contact units 63 in the first curl correction unit 61 and the interval between the contact units 63 in the second curl correction unit 62 may be set to be intervals different from each other. In the examples illustrated in FIGS. 6 and 7, an interval D2 between the contact units 63 in the second curl correction unit 62 is wider than an interval D1 between the contact units 63 in the first curl correction unit 61. Note that, in a case where the banknote P is transported along its long-edge direction, the distance between the contact units 63 is required to be set to be narrower than the width of the banknote P in its short-edge direction.

In the example illustrated in FIG. 6, the upper end part of the contact unit 63 of the first curl correction unit 61 protrudes by 1 mm to the upper side of a surface S of the belt 54 that transports the banknote P. In the example illustrated in FIG. 7, the upper end part of the contact unit 63 of the second curl correction unit 62 protrudes by 1.4 mm to the upper side of the surface S of the belt 54 (the belts 541 and 542) that transports the banknote P. Thus, since the contact unit 63 protrudes to the upper side of the surface S of the belt 54, it is possible to cause a crease in the banknote P transported by the belt 54. Note that, the numerical values in FIGS. 6 and 7 are merely examples and can be changed as appropriate.

In the examples illustrated in FIGS. 6 and 7, the amount of protrusion to the upper side of the surface S of the belt 54 in the second curl correction unit 62 with a wider interval between the contact units 63 is set to be greater than that in the first curl correction unit 61. As a result, the depth of a crease Q caused in the banknote P becomes deeper on an outer side of the banknote P in its short-edge direction so that the degree of correction of curl of the banknote P can be improved more than in a case where the depth of crease is the same on the inner and outer sides.

Figure 8A:
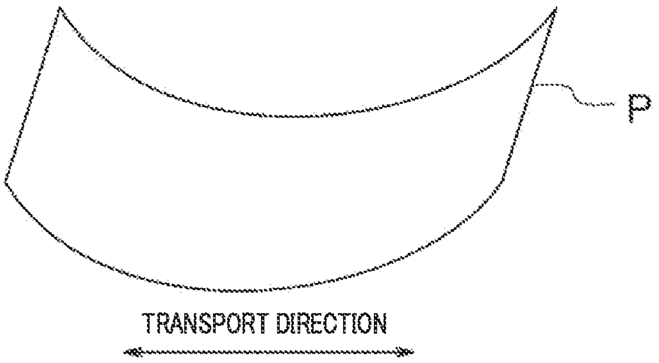
FIG. 8A illustrates a banknote P that is curled before being corrected by the curl correction unit.
Figure 8B:
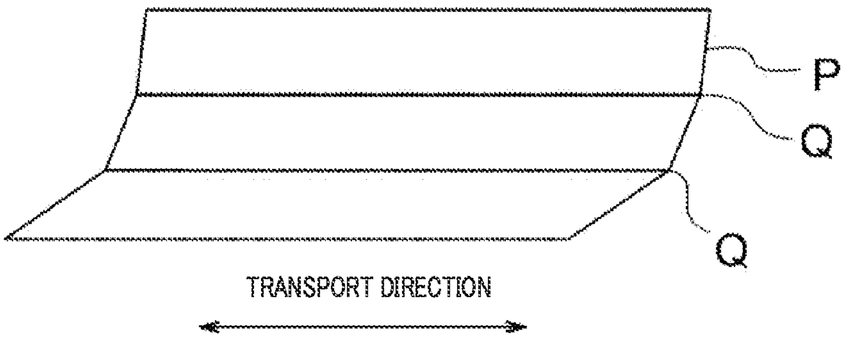
FIG. 8B illustrates the banknote P after the curl is corrected by the first curl correction unit.
Figure 8C:
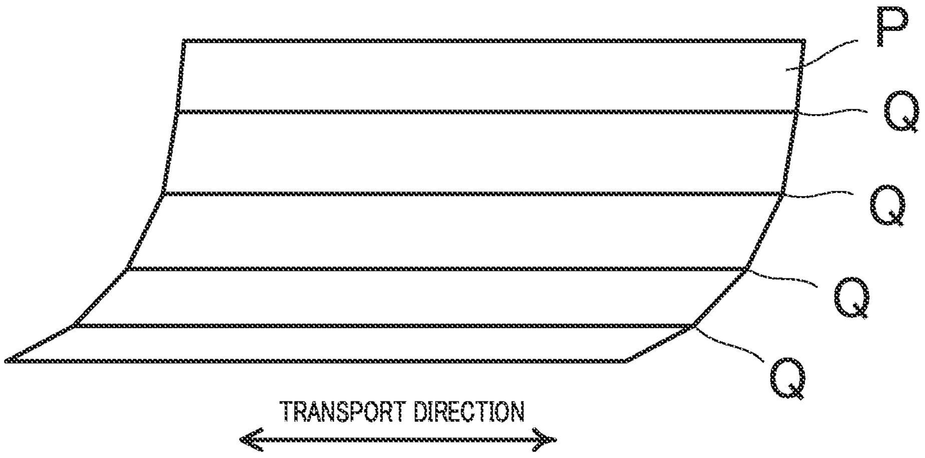
FIG. 8C illustrates the banknote P after the curl is corrected by both the first curl correction unit and the second curl correction unit.

FIGS. 8A, 8B, and 8C are diagrams provided for describing the banknote P whose curl has been corrected by the curl correction unit 6. FIG. 8A illustrates the banknote P that is curled before being corrected by the curl correction unit 6. FIG. 8B illustrates the banknote P after the curl is corrected by the first curl correction unit 61. FIG. 8C illustrates the banknote P after the curl is corrected by both the first curl correction unit 61 and the second curl correction unit 62. In a case where the banknote P is curled along its long-edge direction, setting the transport direction of the first sheet transport mechanism 41 so as to be parallel to the long-edge direction of the banknote P enables the curl correction unit 6 to cause a plurality of the creases Q along the transport direction.

As described above, curl of the banknote P can be corrected by the curl correction unit 6 causing the crease Q, which is a tendency different from curl, in the banknote P. In particular, since the sheet handling apparatus 1 according to the embodiment of the present disclosure is provided with the two curl correction units 6 on the second transport path 512 as illustrated in FIG. 5, it is possible to improve, as illustrated in FIGS. 8B and 8C, the degree of correction of curl of the banknote P more than in a case where only one curl correction unit is provided.

Further, since a plurality of the creases Q can be caused in the banknote P by each of the plurality of curl correction units 6 comprising the two contact units 63, it is possible to improve the degree of curl correction in comparison with the case of one crease.

Further, the configuration in which the interval between the contact units 63 differs in each of the plurality of curl correction units 6 makes it possible to cause the creases Q, whose number is equal to or greater than three, in the banknote P. Accordingly, it is possible to further improve the degree of curl correction in comparison with the case of one or two creases. The configuration in which the amount of protrusion of the contact unit 63 from the surface of the belt 54 varies depending on the curl correction unit 6 makes it possible to further improve the degree of curl correction.

Providing a flange as the contact unit 63 in the end part of the pulley 55 also makes it possible to expect a secondary effect that the belt 54 hardly comes off the pulley 55.

The curl correction unit 6 illustrated in FIGS. 5 to 7 is merely an example of the curl correction unit of the present disclosure. Although the contact unit 63 is provided in the pulley 55 or the pulley 551 disposed on the lower side of a passage surface of the banknote P in the examples illustrated in FIGS. 6 and 7, the contact unit of the curl correction unit may be provided in a pulley disposed on the upper side of the passage surface of the banknote P in the present disclosure. In this case, a drive force of a motor may be given to the pulley disposed on the upper side of the passage surface of the banknote P.

In the examples illustrated in FIGS. 6 and 7, the first curl correction unit 61 and the second curl correction unit 62 comprise configurations different from each other, but may have the same configuration in the sheet transport mechanism and the sheet handling apparatus of the present disclosure. Specifically, the interval between the contact units 63 may be the same in the first curl correction unit 61 and the second curl correction unit 62. Further, the amount of protrusion to the upper end of the contact unit 63 from the surface of the belt 54 may be the same in the first curl correction unit 61 and the second curl correction unit 62. Even in this case, the first curl correction unit 61 and the second curl correction unit 62 can cause two or more creases in a banknote so that a sufficient effect of curl correction can be achieved.

Although the first curl correction unit 61 and the second curl correction unit 62 each comprise the two contact units 63 in the examples illustrated in FIGS. 6 and 7, the curl mechanisms may comprise, for example, three or more contact units in the sheet transport mechanism and the sheet handling apparatus of the present disclosure. Specifically, another pulley may be provided between the two pulleys 551 and 552 illustrated in FIG. 7 and may be provided with a flange as the contact unit. Alternatively, it may be configured such that each of the two pulleys 551 and 552 illustrated in FIG. 7 comprises flanges as the contact units on both sides.

Although the two curl correction units 6 (the first correction unit 61 and the second correction unit 62) are provided on the second transport path 512 in the example illustrated in FIG. 5, three or more curl correction units may be provided in the sheet transport mechanism and the sheet handling apparatus of the present disclosure.

Figure 9A:
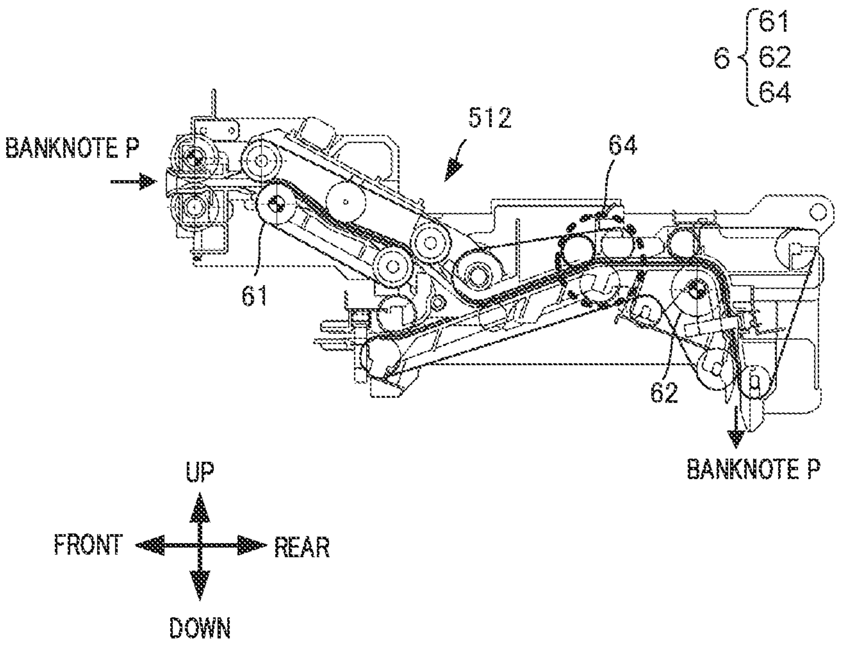
FIG. 9A illustrates a disposition position of a third curl correction unit on the second transport path.
Figure 9B:
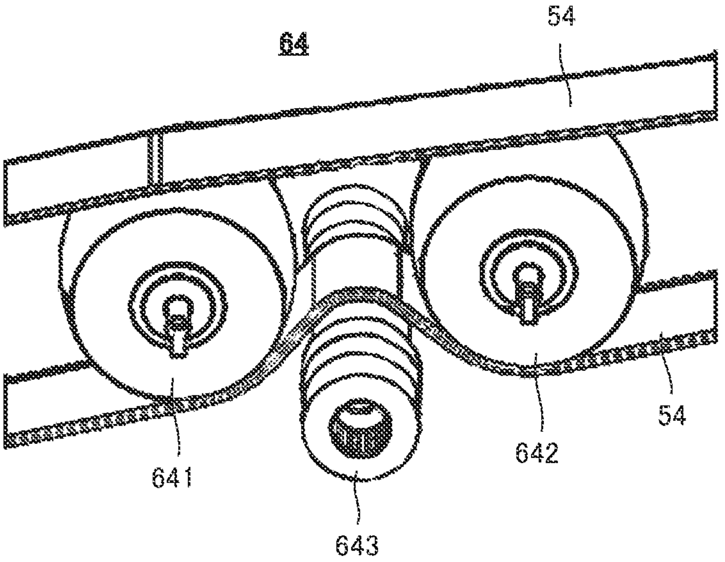
FIG. 9B is a schematic diagram provided for describing the third curl correction unit.

FIGS. 9A and 9B illustrate how a third curl correction unit 64 in addition to the first correction unit 61 and the second correction unit 62 are provided on the second transport path 512 as a variation. FIG. 9A illustrates a disposition position of the third curl correction unit 64 on the second transport path 512. FIG. 9B is a schematic diagram provided for describing the third curl correction unit 64.

In the variation illustrated in FIG. 9A, the third curl correction unit 64 is provided downstream of the first curl correction unit 61 and upstream of the second correction unit 62 in the transport direction of the second transport path 512. As described above, it is possible to improve the effect of correcting curl of a sheet passing through the second transport path 512 by increasing the number of curl correction units.

As illustrated in FIG. 9B, the third curl correction unit 64 may comprise a configuration different from those of the first correction unit 61 and the second correction unit 62 illustrated in FIGS. 6 and 7. Specifically, the third curl correction unit 64 comprises no contact unit and comprises two upper rollers 641 and 642 on the upper side of the belt 54 and one lower roller 643 on the lower side of the belt 54, respectively. The upper roller 641, the lower roller 643, and the upper roller 642 are disposed close to each other in the flow direction of the second transport path 512.

The third curl correction unit 64 exemplified in FIG. 9B holds a sheet transported on the belt 54 between the upper rollers 641 and 642 and the lower roller 643 to thereby correct curl of the sheet. More specifically, a sheet that has flowed on the belt 54 is first held between the upper roller 641 and the lower roller 643. Since the upper roller 641 and the lower roller 643 are disposed close to each other in the flow direction of the second transport path 512 as described above, the sheet transported on the belt 54 is held between the upper roller 641 and the lower roller 643, and thus, pressure is applied on the sheet.

When the sheet is further transported, the sheet is this time held between the lower roller 643 and the upper roller 642, and thus, pressure is applied on the sheet. As described above, the upper rollers 641 and 642 and the lower roller 643 hold the sheet transported on the belt therebetween to apply pressure on the sheet, and thus, the curl of the sheet is corrected.

In the third curl correction unit 64 illustrated in FIG. 9B, the two upper rollers 641 and 642 are preferably disposed such that the distance between the rollers is shorter than the length of a sheet along the transport direction of the second transport path 512. The reason is that since the leading end part of the sheet in the transport direction is in a state of being held between the upper roller 642 and the lower roller 643 and the rear end part of the sheet in the transport direction is in a state of being held between the upper roller 641 and the lower roller 643, respectively, depending on the position of the sheet transported on the belt 54, it is possible to expect an improved effect of curl correction.

For example, in a case where the sheet handling apparatus 1 handles the banknotes P of a plurality of denominations, in other words, the banknotes P with sizes different from each other, the interval between the contact units 63 in the plurality of curl correction units 6 may be set to be a value smaller than the width of the banknote P in its short-edge direction which comprises the smallest width in the short-edge direction among the banknotes P. Thus, the curl correction unit 6 can achieve a curl correction effect on every kind of denomination of the banknote P.

Operation of Sheet Handling Apparatus

Next, an operation of the sheet handling apparatus 1 will be described. Note that, the operation described below is only one example, and any other processing can be performed in the range of applicability of the sheet handling apparatus of the present disclosure.

(Depositing Processing from Storage Cassette)

First, depositing processing from the storage cassette 200 by using the cassette processing unit 23 as an example of the feeding mechanism of the present disclosure will be described.

In order to attach the storage cassette 200 to the sheet handling apparatus 1, the user sets such that the attachment port 221 of the cassette attachment unit 22 is in a state of not being closed by the closing member 7. The user does not perform the above-described operation in a case where the attachment port 221 is in a state of not being closed by the closing member 7 when the user intends to perform the depositing processing from the storage cassette 200.

The user attaches the storage cassette 200 to the cassette attachment unit 22 and performs a starting operation of the depositing processing by using the operation unit 13. The control unit 31 controls the storage cassette 200 and the cassette handling unit 23 such that the banknotes P are fed out one by one to the second transport path 512 of the transport unit 5. The control unit 31 controls the transport unit 5 such that the banknotes P are transported one by one. In the present embodiment, the cassette handling unit 23 feeds out the banknote P to the transport unit 5 such that the long-edge direction of the banknote P is parallel to the transport direction.

Since the plurality of curl correction units 6 is disposed on the second transport path 512 as described above, the banknote P that is curled by being stored in the storage cassette 200 is corrected by the curl correction units 6.

The control unit 31 causes the recognition unit 25 provided on the upper-side path 521 to recognize the banknote P. The recognition unit 25 recognizes each kind, authentication, and fitness of the banknotes P to be transported sequentially, generates signals indicating recognition results, and outputs the signals to the control unit 31. The control unit 31 determines, based on the received signals, whether each of the banknotes P is a depositable banknote P or a non-depositable banknote P.

The control unit 31 controls the transport unit 5 and the storage unit 26 such that the banknote P in the case of being recognized as a depositable banknote P is stored in the first to fourth storage boxes 261 to 264 for each denomination. The control unit 31 controls the transport unit 5 such that the banknote P in the case of being recognized as a non-depositable banknote P is stored in the upper reject storage unit 28 or the count reject storage unit 29.

When every banknote P has been deposited from the storage cassette 200, the user detaches the storage cassette 200 from the cassette attachment unit 22. After detaching the storage cassette 200, the user may operate the closing member 7 such that the attachment port 221 is closed.

As described above, in the deposition processing from the storage cassette 200 in which the banknote P stored therein is likely to be curled, the sheet handling apparatus 1 transports and stores the banknote P by using the second transport path 512 provided with the plurality of curl correction units 6. Accordingly, it is possible to efficiently correct the banknote P that is curled.

(Depositing Processing from Depositing Unit)

Second, depositing processing from the depositing unit 21 will be described.

The user sets such that the inlet 125 of the depositing unit 21 is in a state of not being closed by the closing member 7. The user does not perform the above-described operation in a case where the inlet 125 is in a state of not being closed by the closing member 7 when the user intends to perform the depositing processing from the depositing unit 21.

The user inputs at least one banknote P into the depositing unit 21 and performs a starting operation of the depositing processing by using the operation unit 13 of the sheet handling apparatus 1. The control unit 31 controls the depositing unit 21 such that the at least one banknote P is fed out one by one to the third transport path 513 of the transport unit 5. The control unit 31 controls the transport unit 5 such that the at least one banknote P is transported one by one. In the present embodiment, the depositing unit 21 feeds out the banknote P to the transport unit 5 such that the long-edge direction of the banknote P is parallel to the transport direction.

The control unit 31 causes the recognition unit 25 provided on the upper-side path 521 to recognize the banknote P. The recognition unit 25 recognizes each kind, authentication, and fitness of the at least one banknote P to be transported sequentially, generates signals indicating recognition results, and outputs the signals to the control unit 31. The control unit 31 determines, based on the received signals, whether each of the at least one banknote P is a depositable banknote P or a non-depositable banknote P.

The control unit 31 controls the transport unit 5 and the storage unit 26 such that the banknote P in the case of being recognized as a depositable banknote P is stored in the first to fourth storage boxes 261 to 264 for each denomination. The control unit 31 controls the transport unit 5 such that the banknote P in the case of being recognized as a non-depositable banknote P is transported to the dispensing unit 24. That is, in the depositing processing from the depositing unit 21, a non-depositable banknote P is rejected from the dispensing unit 24, whereby the depositing processing from the depositing unit 21 is completed.

As described above, the banknote P deposited through the depositing unit 21 is transported to the storage unit 26 via the third transport path 513 that is not provided with the curl correction unit 6. Accordingly, it is possible to configure such that unnecessary stress by the curl correction unit 6 is not applied to the banknote P deposited through the depositing unit 21, which is not curled or whose degree of curl is relatively low.

(Dispensing Processing to Dispensing Unit)

Next, dispensing processing to the dispensing unit 24 will be described. In the dispensing processing to the dispensing unit 24, the sheet handling apparatus 1 dispenses the banknote P, which has been fed out from the first to fourth storage boxes 261 to 264, from the dispensing unit 24.

First, the user sets such that the outlet 126 of the dispensing unit 24 is in a state of not being closed by the closing member 7. The user does not perform the above-described operation in a case where the outlet 126 is in a state of not being closed by the closing member 7 when the user intends to perform the dispensing processing from the dispensing unit 24.

The user performs a starting operation of the dispensing processing of a predetermined number of the banknotes P of predetermined denominations by using the operation unit 13. The control unit 31 controls the first to fourth storage boxes 261 to 264 and the transport unit 5 such that the predetermined number of the banknotes P is transported one by one to the recognition unit 25. The recognition unit 25 recognizes the predetermined number of the banknotes P to be transported sequentially, generates signals indicating recognition results, and outputs the signals to the control unit 31. The control unit 31 determines, based on the received signals, whether each of the predetermined number of the banknotes P is a dispensable banknote P or a non-dispensable banknote P.

The control unit 31 controls the transport unit 5 based on the recognition results and causes a dispensable banknote P to be transported to the dispensing unit 24.

The control unit 31 controls the transport unit 5 and the temporary storage unit 30 based on the recognition results such that a non-dispensable banknote P is held in the temporary storage unit 30. After every banknote P to be dispensed has been transported to the dispensing unit 24, the control unit 31 controls the temporary storage unit 30 and the transport unit 5 such that a non-dispensable banknote P is transported to the upper reject storage unit 28.

When the dispensing processing has been completed, the user takes out the predetermined number of the banknotes P via the outlet 126, whereby the dispensing processing is completed.

In the dispensing processing to the dispensing unit 24, the banknote P fed out from the storage unit 26 is transported to the dispensing unit 24 via the storage transport path, the front reverse rotation path 523, the upper-side path 521, and the fifth transport path 515 which are not provided with the curl correction unit 6. Accordingly, it is possible to configure such that unnecessary stress by the curl correction unit 6 is not applied to the banknote P dispensed from the dispensing unit 24, which is not curled or whose curl has already been corrected.

Embodiment 2

In Embodiment 2, the feeding mechanism differs from that in Embodiment 1 and the disposition position of the curl correction unit differs from that in Embodiment 1 correspondingly.

Figure 10:
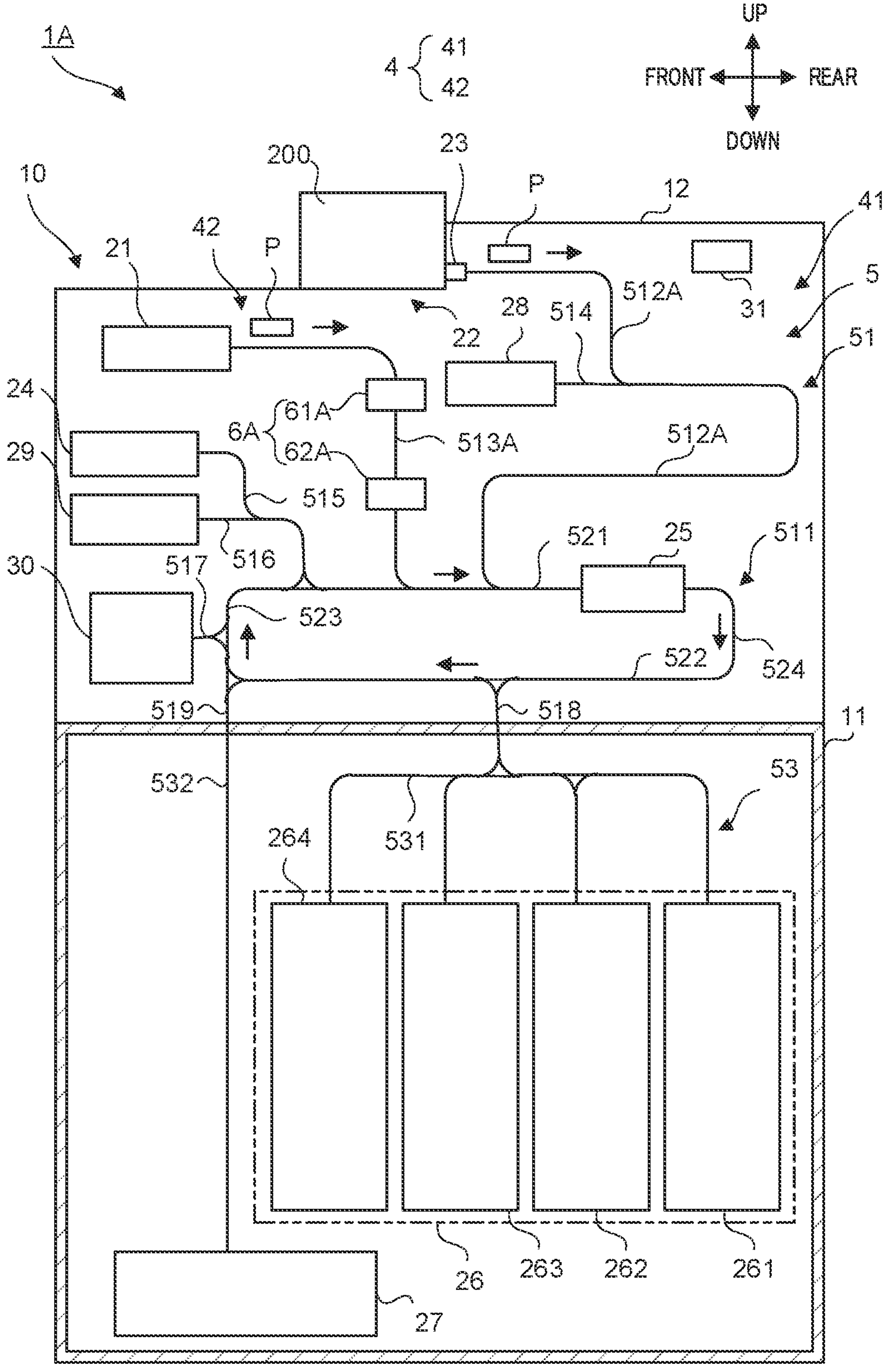
FIG. 10 is a schematic diagram illustrating an inner configuration of a sheet handling apparatus according to Embodiment 2.

FIG. 10 is a schematic diagram illustrating an inner configuration of a sheet handling apparatus 1A according to Embodiment 2. In FIG. 10, the configurations different from those in Embodiment 1 are denoted by adding "A" to the reference signs for the configurations.

In Embodiment 1, the cassette handling unit 23 is an example of the feeding mechanism, whereas in Embodiment 2, the depositing unit 21 is an example of the feeding mechanism. For this reason, in Embodiment 2, a first curl correction unit 61A and a second curl correction unit 62A are provided on a third transport path 513A connected to the depositing unit 21.

In Embodiment 2, it is assumed that the banknote P to be deposited by the user via the depositing unit 21 is in a strongly curled state. For example, an operation in which a banknote stored in a tape-type storage box of another apparatus is dispensed and collected and is deposited into the sheet handling apparatus 1A by manual loading is assumed.

With the configuration illustrated in FIG. 10, the sheet handling apparatus 1A according to Embodiment 2 enables a curl correction unit 6A to correct the banknote P that is deposited through the depositing unit 21 at the time of depositing processing and is strongly curled. At this time, the correction is performed by a plurality of the curl correction units 6A so that it is possible to further improve the degree of curl correction.

Embodiment 3

In Embodiment 3, the feeding mechanism and the acceptance mechanism differ from those in Embodiment 1, and the disposition position of the curl correction unit differs from that in Embodiment 1 correspondingly.

Figure 11:
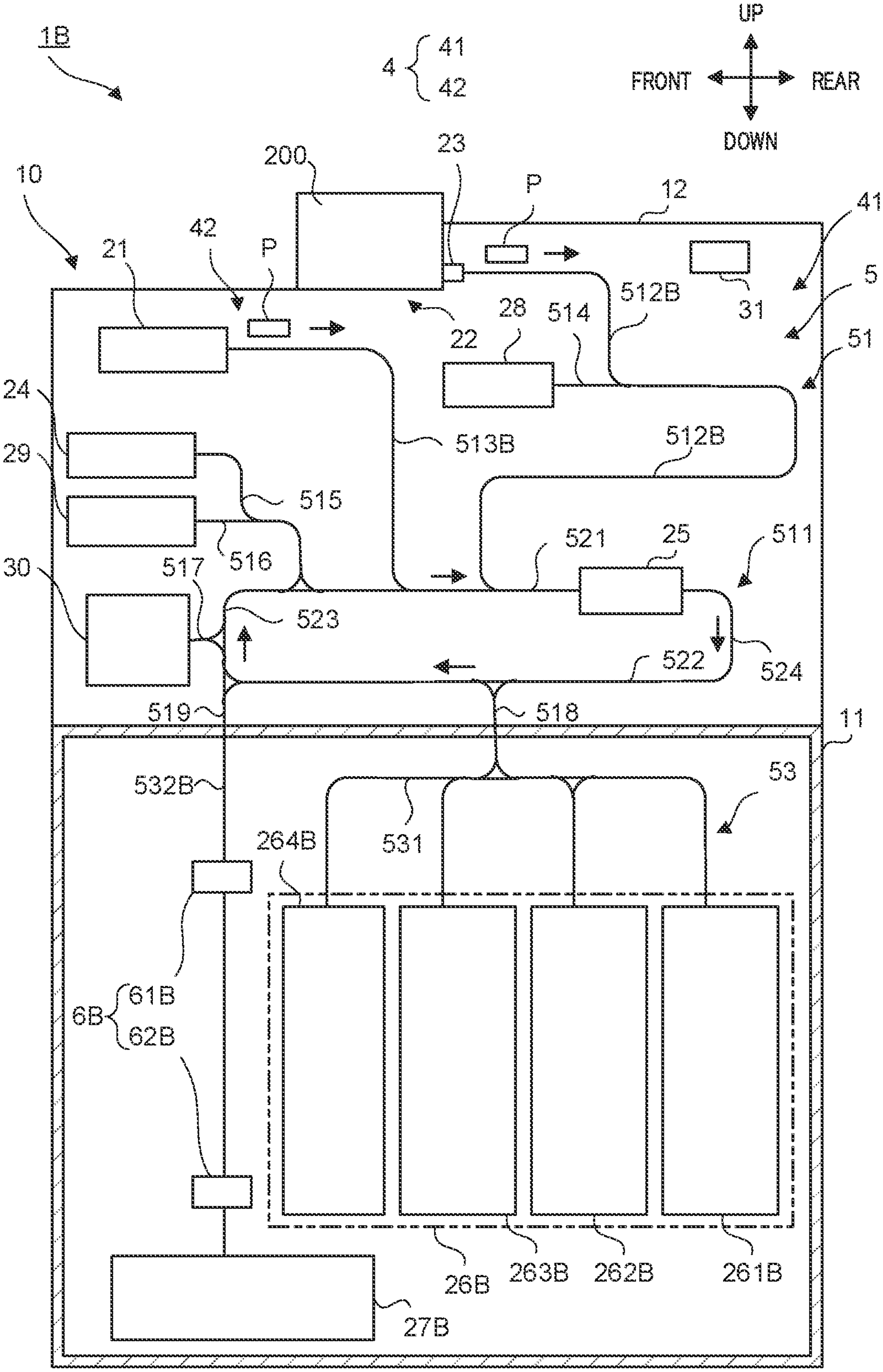
FIG. 11 is a schematic diagram illustrating an inner configuration of a sheet handling apparatus according to Embodiment 3.

FIG. 11 is a schematic diagram illustrating an inner configuration of a sheet handling apparatus 1B according to Embodiment 3. In FIG. 11, the configurations different from those in Embodiment 1 are denoted by adding "B" to the reference signs for the configurations.

In Embodiment 3, a storage unit 26B is an example of the feeding mechanism, and a collection unit 27B is an example of the acceptance mechanism. In the sheet handling apparatus 1B according to Embodiment 3, the storage unit 26B, that is, first to fourth storage boxes 261B to 264B are tape-type storage units. Accordingly, the banknote P stored in the storage unit 26B is in a strongly curled state. At the time of collection processing in which the banknote P stored in the storage unit 26B is collected in the collection unit 27B, the banknote P that is curled is corrected by a plurality of curl correction units 6B.

For this reason, the plurality of curl correction units 6B is provided on a twelfth transport path 532B of the lower-side transport unit 53 in Embodiment 3.

With the configuration illustrated in FIG. 11, the sheet handling apparatus 1B according to Embodiment 3 enables the curl correction unit 6B to correct the banknote P that is fed out from the storage unit 26 at the time of the collection processing and is strongly curled. At this time, the correction is performed by the plurality of curl correction units 6B so that it is possible to further improve the degree of curl correction.

Note that, although a first curl correction unit 61B and a second curl correction unit 62B are provided on the twelfth transport path 532 in the example illustrated in FIG. 11, the plurality of curl correction units 6B may be provided in one part on a transport route from the storage unit 26B to the collection unit 27B in the present Embodiment 3. That is, the plurality of curl correction units 6B may be provided in one of the eleventh transport path 531, the eighth transport path 518, a part on the lower-side path 522 where the part connects the eighth transport path 518 and the ninth transport path 519, the ninth transport path 519, and the twelfth transport path 532B.

Embodiment 4

In Embodiment 4, the acceptance mechanism differs from that in Embodiment 3, and the disposition position of the curl correction unit differs from that in Embodiment 3 correspondingly.

Figure 12:
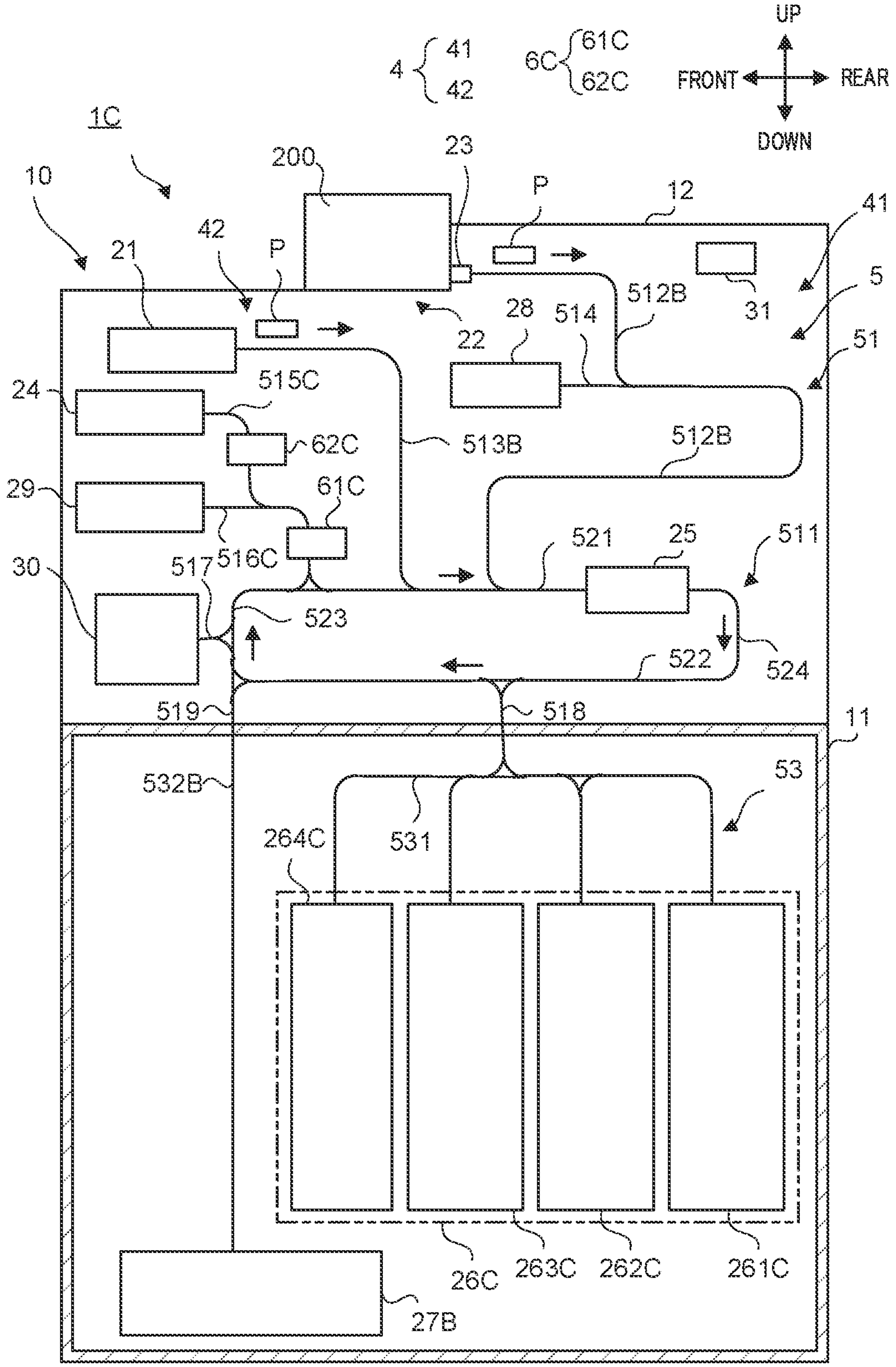
FIG. 12 is a schematic diagram illustrating an inner configuration of a sheet handling apparatus according to Embodiment 4.

FIG. 12 is a schematic diagram illustrating an inner configuration of a sheet handling apparatus 1C according to Embodiment 4. In FIG. 12, the configurations different from those in Embodiment 3 are denoted by adding "C" to the reference signs for the configurations.

In Embodiment 4, the storage unit 26B is an example of the feeding mechanism in the same manner as in Embodiment 3. However, Embodiment 4 differs from Embodiment 3 in that the dispensing unit 24 is an example of the acceptance mechanism. In Embodiment 4, the banknote P that is curled is corrected by a plurality of curl correction units 6C at the time of dispensing processing in which the banknote P stored in a storage unit 26C is dispensed to the dispensing unit 24.

For this reason, in Embodiment 4, a first curl correction unit 61C is provided on the sixth transport path 516 and a second curl correction unit 62C is provided on a fifth transport path 515C, respectively.

With the configuration illustrated in FIG. 12, the sheet handling apparatus 1C according to Embodiment 4 enables the curl correction unit 6C to correct the banknote P that is fed out from the storage unit 26 at the time of the dispensing processing and is strongly curled. At this time, the correction is performed by the plurality of curl correction units 6C so that it is possible to further improve the degree of curl correction.

Note that, in the example illustrated in FIG. 12, the first curl correction unit 61C is provided on the sixth transport path 516 and the second curl correction unit 62C is provided on the fifth transport path 515C. In the present Embodiment 4, however, the plurality of curl correction units 6C may be provided in one part on a transport route from the storage unit 26C to the dispensing unit 24. That is, the plurality of curl correction units 6C may be provided in one of the eleventh transport path 531, the eighth transport path 518, a part on the lower-side path 522 where the part connects the eighth transport path 518 and the sixth transport path 516, the sixth transport path 516, and the fifth transport path 515.

Embodiments 1 to 4 in which the feeding mechanism and the acceptance mechanism differ, respectively, have been described above. The embodiments described above are examples of the present disclosure, and the feeding mechanism and the acceptance mechanism may be configurations other than those in the embodiments described above (for example, the temporary storage unit 30). Further, the combination of the feeding mechanism and the acceptance mechanism is not limited to the combinations described in the respective embodiments. For example, the feeding mechanism may be the cassette handling unit and the acceptance mechanism may be the dispensing unit.

Embodiment 5

Figure 13:
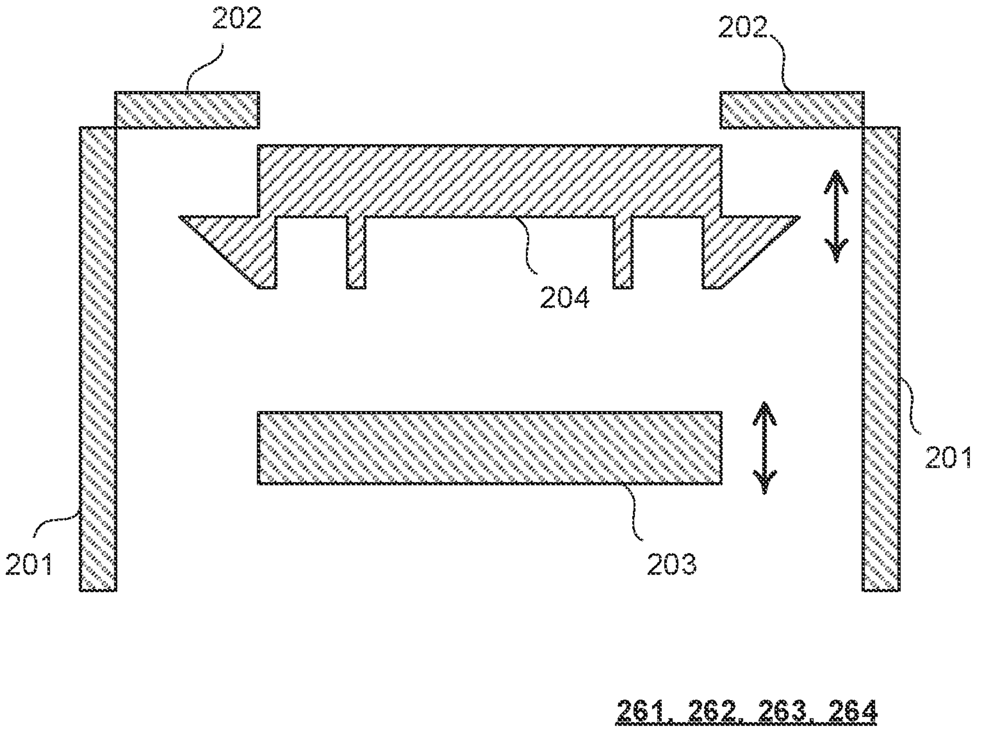
FIG. 13 is a schematic diagram provided for describing an inner structure of the storage cassette.

In Embodiment 5, an inner structure of the first to fourth storage boxes 261 to 264 will be described in detail. In Embodiment 5, it is assumed that the first to fourth storage boxes 261 to 264 are stacking-type storage units. FIG. 13 is a schematic diagram provided for describing the inner structure of the first to fourth storage boxes 261 to 264. FIG. 13 illustrates a cross-sectional view of the first to fourth storage boxes 261 to 264 along the up-down direction. As illustrated in FIG. 13, the first to fourth storage boxes 261 to 264 comprise a side wall 201, a top plate 202, a stage 203, and a stacking lever 204.

The banknote P stored in the first to fourth storage boxes 261 to 264 is stacked on the stage 203. The stage 203 is movable in the up-down direction inside a housing formed of the side wall 201 and the top plate 202.

The stage 203 moves upward and downward in accordance with the amount of the banknotes P to be stacked. The stage 203 moves downward as the number of the banknotes P increases, and moves upward as the number of the banknotes P decreases. In a case where the stage 203 reaches its lowest position, the first to fourth storage boxes 261 to 264 are in a full state and can no longer store the banknote P.

The stacking lever 204 is movable upward and downward independently of the stage 203. The stacking lever 204 hits the banknote P, which has been received by the first to fourth storage boxes 261 to 264, by the movement of the stacking lever 204 upward and downward and stacks the banknote P on the stage 203. The stacking lever 204 makes it possible to stack the banknotes P in an aligned state on the stage 203.

As illustrated in FIG. 13, the outer edge part of the stacking lever 204 is formed in a tapered shape whose width becomes narrower downward. In a case where the first to fourth storage boxes 261 to 264 receive the banknote P that is curled, such a shape makes it easier for the stacking lever 204 to move to the inner side of the banknote P that is curled. The movement of the stacking lever 204 to the inner side of the curl of the banknote P makes it possible to cause a state in which the curl of the banknote P is stretched. Further, it is possible to prevent folding of the banknote P that may occur in a case where there is no tapered shape.

Figure 14A:
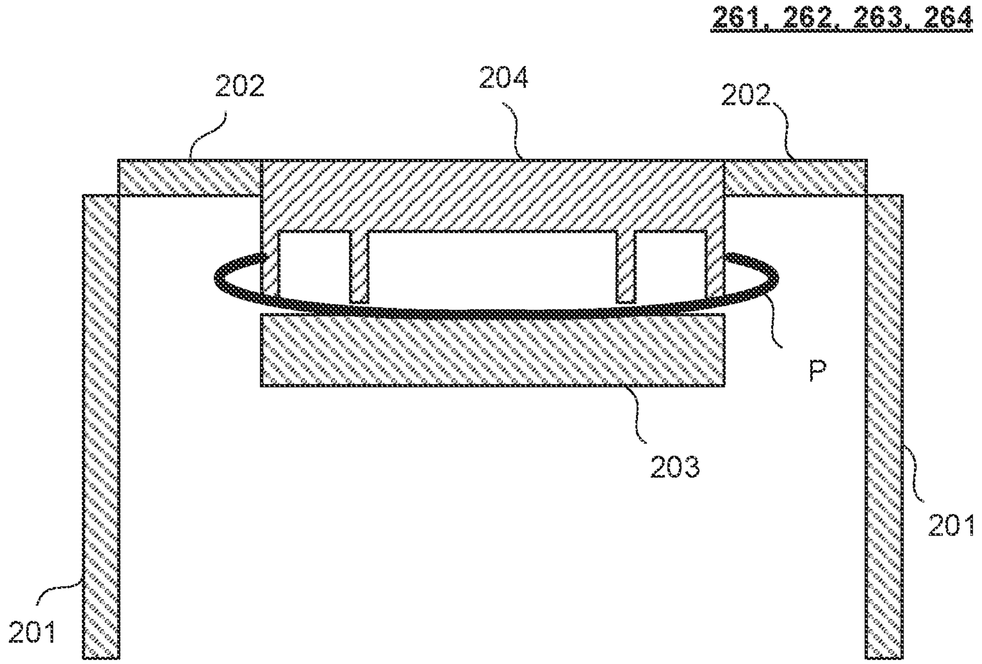
FIG. 14A is a diagram provided for describing that a banknote is folded in a case where the outer edge part of a stacking lever is not provided with a tapered shape.
Figure 14B:
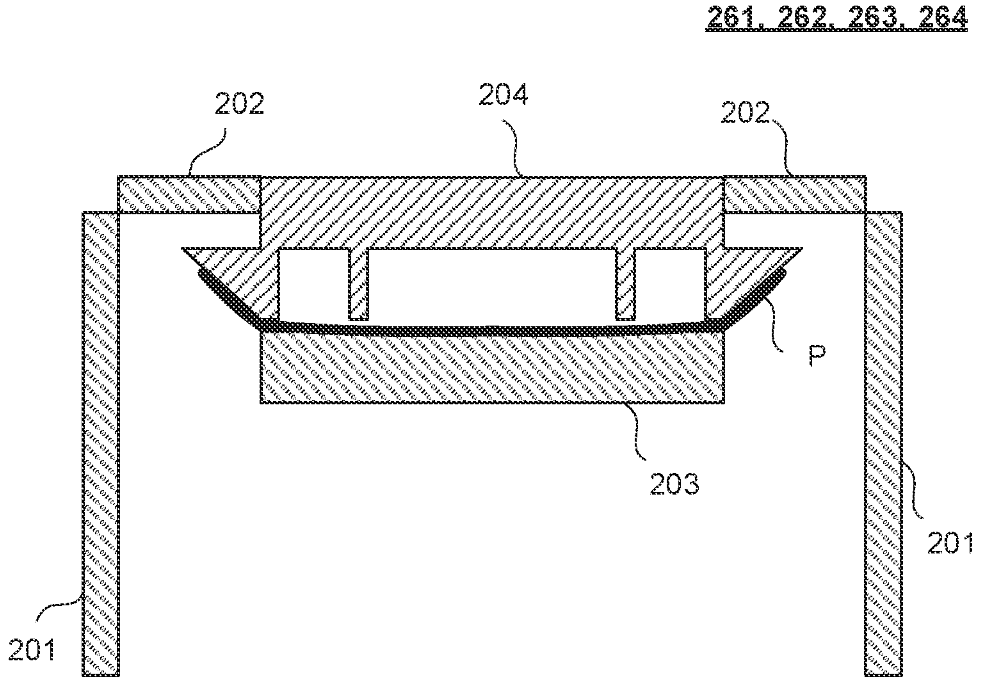
FIG. 14B is a diagram provided for describing that a banknote is not folded in a case where the outer edge part of the stacking lever is provided with a tapered shape.

FIGS. 14A and 14B are diagram provided for describing whether the banknote P is folded between in a case where the outer edge part of the stacking lever 204 is provided with a tapered shape and in a case where the outer edge part of the stacking lever 204 is not provided with a tapered shape. FIG. 14A illustrates the case where the outer edge part of the stacking lever 204 is not provided with a tapered shape, and FIG. 14B illustrates the case where the outer edge part of the stacking lever 204 is provided with a tapered shape. As illustrated in FIG. 14A, in the case where the outer edge part of the stacking lever 204 is not provided with a tapered shape, both end parts of the banknote P may be folded and bend between the stage 203 and the stacking lever 204. As illustrated in FIG. 14B, in the case where the outer edge part of the stacking lever 204 is provided with a tapered shape, it is possible to prevent the banknote P from being folded as in FIG. 14A.

What is claimed is:

1. A sheet transport mechanism disposed between a feeding mechanism and an acceptance mechanism, the feeding mechanism feeding out a sheet, the acceptance mechanism receiving the sheet, the sheet transport mechanism comprising:

a transport unit that transports the sheet; and a plurality of curl correction units each comprising a contact unit, the contact unit coming into contact with the sheet that is transported by the transport unit, wherein;

the plurality of curl correction units is disposed at positions different from each other in a transport direction on a transport route of the transport unit, the plurality of curl correction units each comprises a plurality of the contact units, the transport unit comprises a belt, and each of the plurality of contact units is a flange provided in a pulley that drives the belt.

2. The sheet transport mechanism according to claim 1, wherein the contact unit causes a crease in the sheet with which the contact unit comes in contact, the crease being a crease along a transport direction of the transport unit.

3. The sheet transport mechanism according to claim 2, wherein the plurality of curl correction units causes a plurality of the creases at positions of the sheet, respectively, the positions differing from each other.

4. The sheet transport mechanism according to claim 1, wherein a distance between a plurality of the flanges comprised in each of the plurality of curl correction units varies depending on the plurality of curl correction units.

5. A sheet handling apparatus, comprising:

a feeding mechanism that feeds out a sheet;

an acceptance mechanism that receives the sheet; and a first sheet transport mechanism disposed between the feeding mechanism and the acceptance mechanism, wherein:

the first sheet transport mechanism comprises:

a transport unit that transports the sheet; and a plurality of curl correction units each comprising a contact unit, the contact unit coming into contact with the sheet that is transported by the transport unit, wherein:

the plurality of curl correction units is disposed at positions different from each other in a transport direction on a transport route of the first sheet transport mechanism, the transport unit comprises a belt, and each of the plurality of contact units is a flange provided in a pulley that drives the belt.

6. The sheet handling apparatus according to claim 5, wherein the feeding mechanism feeds out the sheet to the transport unit, the sheet having been taken out from a storage cassette that stores the sheet.

7. The sheet handling apparatus according to claim 5, wherein the feeding mechanism feeds out the sheet to the transport unit, the sheet having been taken out from a tape-type storage unit that stores the sheet by winding up the sheet, together with a tape, on a drum.

8. The sheet handling apparatus according to claim 5, further comprising a second sheet transport mechanism disposed between an inlet and the acceptance mechanism, the inlet receiving a deposit of the sheet, wherein the plurality of curl correction units is disposed at positions on the transport route of the first sheet transport mechanism, respectively, the positions not overlapping with a transport route of the second sheet transport mechanism.

9. The sheet handling apparatus according to claim 5, further comprising a recognition unit that recognizes the sheet, wherein the plurality of curl correction units is disposed upstream of the recognition unit on the transport route of the first sheet transport mechanism.

10. The sheet handling apparatus according to claim 5, wherein the acceptance mechanism receives the sheet to be collected in a collection unit that collects the sheet.

11. The sheet handling apparatus according to claim 5, wherein the acceptance mechanism receives the sheet to be dispensed to an outlet through which the sheet is dispensed outside the sheet handling apparatus.

12. The sheet handling apparatus according to claim 5, wherein the acceptance mechanism receives the sheet and stores the sheet in a stacked state.

13. The sheet handling apparatus according to claim 5, wherein the acceptance mechanism feeds out the sheet stored therein.

* * * * *